(12) United States Patent
Klasing et al.

(10) Patent No.: US 8,512,003 B2
(45) Date of Patent: Aug. 20, 2013

(54) TIP RAMP TURBINE BLADE

(75) Inventors: Kevin Samuel Klasing, Springboro, OH (US); Ching-Pang Lee, Cincinnati, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1699 days.

(21) Appl. No.: 11/507,116

(22) Filed: Aug. 21, 2006

(65) Prior Publication Data

US 2008/0044289 A1 Feb. 21, 2008

(51) Int. Cl.
*F01D 5/14* (2006.01)

(52) U.S. Cl.
USPC .......................................... 416/228

(58) Field of Classification Search
USPC ................. 415/173.1, 173.4, 174.4; 416/228
See application file for complete search history.

(56) References Cited

U.S. PATENT DOCUMENTS

| | | | |
|---|---|---|---|
| 3,635,585 A | 1/1972 | Metzler | |
| 3,781,129 A | 12/1973 | Aspinwall | |
| 3,854,842 A * | 12/1974 | Caudill | 415/116 |
| 4,010,531 A | 3/1977 | Andersen et al. | |
| 4,142,824 A | 3/1979 | Andersen | |
| 4,390,320 A | 6/1983 | Eiswerth | |
| 4,424,001 A | 1/1984 | North et al. | |
| 4,497,613 A * | 2/1985 | Carreno | 416/228 |
| 4,589,823 A * | 5/1986 | Koffel | 416/92 |
| 4,606,701 A | 8/1986 | McClay et al. | |
| 4,761,116 A * | 8/1988 | Braddy et al. | 416/92 |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 6,039,531 A | 3/2000 | Suenaga et al. | |
| 6,059,530 A | 5/2000 | Lee | |
| 6,086,328 A | 7/2000 | Lee | |
| 6,164,914 A | 12/2000 | Correia et al. | |
| 6,224,336 B1 | 5/2001 | Kercher | |
| 6,502,303 B2 * | 1/2003 | Updegrove et al. | 29/889.1 |
| 6,527,514 B2 | 3/2003 | Roeloffs | |
| 6,554,575 B2 | 4/2003 | Leeke et al. | |
| 6,595,749 B2 | 7/2003 | Lee et al. | |
| 6,672,829 B1 | 1/2004 | Cherry et al. | |
| 6,790,005 B2 | 9/2004 | Lee et al. | |
| 7,287,959 B2 * | 10/2007 | Lee et al. | 416/97 R |

OTHER PUBLICATIONS

U.S. Appl. No. 11/507,119, filed Aug. 21, 2006, by K.S. Klasing et al.

(Continued)

*Primary Examiner* — Nathaniel Wiehe
*Assistant Examiner* — Ryan Ellis
(74) *Attorney, Agent, or Firm* — General Electric Company; David J. Clement; Jonathan M. Hines

(57) ABSTRACT

A turbine blade includes first and second tip ribs extending from a tip floor to define a tip cavity. An exit ramp bridges the ribs and rises in elevation aft from the floor.

19 Claims, 5 Drawing Sheets

(56) References Cited

OTHER PUBLICATIONS

U.S. Appl. No. 11/507,120, filed Aug. 21, 2006, by K.S. Klasing et al.
U.S. Appl. No. 11/507,121, filed Aug. 21, 2006, by K.S. Klasing et al.
U.S. Appl. No. 11/507,132, filed Aug. 21, 2006, by Ching-Pang Lee et al.
Mischo, B.,"Flow Physics and Profiling of Recessed Blade Tips: Impact on Performance and Heat Load," ASME GT2006-91074, May 8-11, 2006, pp. 1-11.
U.S. Appl. No. 11/162,433, "Turbine Airfoil with Curved Squealer Tip," filed Sep. 9, 2005, M.E. Stegemiller et al.
U.S. Appl. No. 11/162,434, "Turbine Airfoil Curved Squealer Tip with Tip Shelf," filed Sep. 9, 2005, M.E. Stegemiller et al.

* cited by examiner

US 8,512,003 B2

TIP RAMP TURBINE BLADE

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes. The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes first and second tip ribs extending from a tip floor to define a tip cavity. An exit ramp bridges the ribs and rises in elevation aft from the floor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
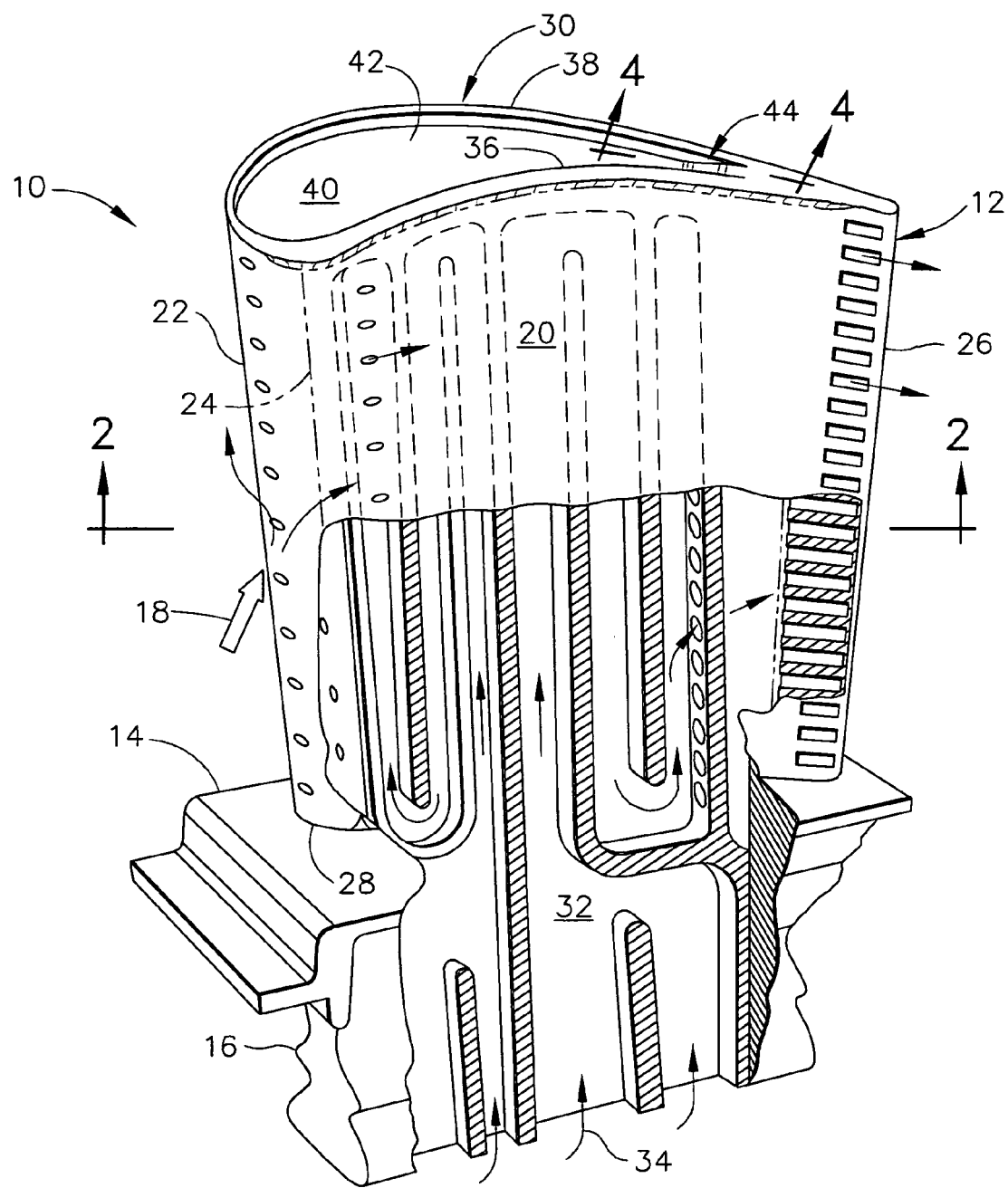
FIG. 1 is a partly sectional isometric view of an exemplary turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
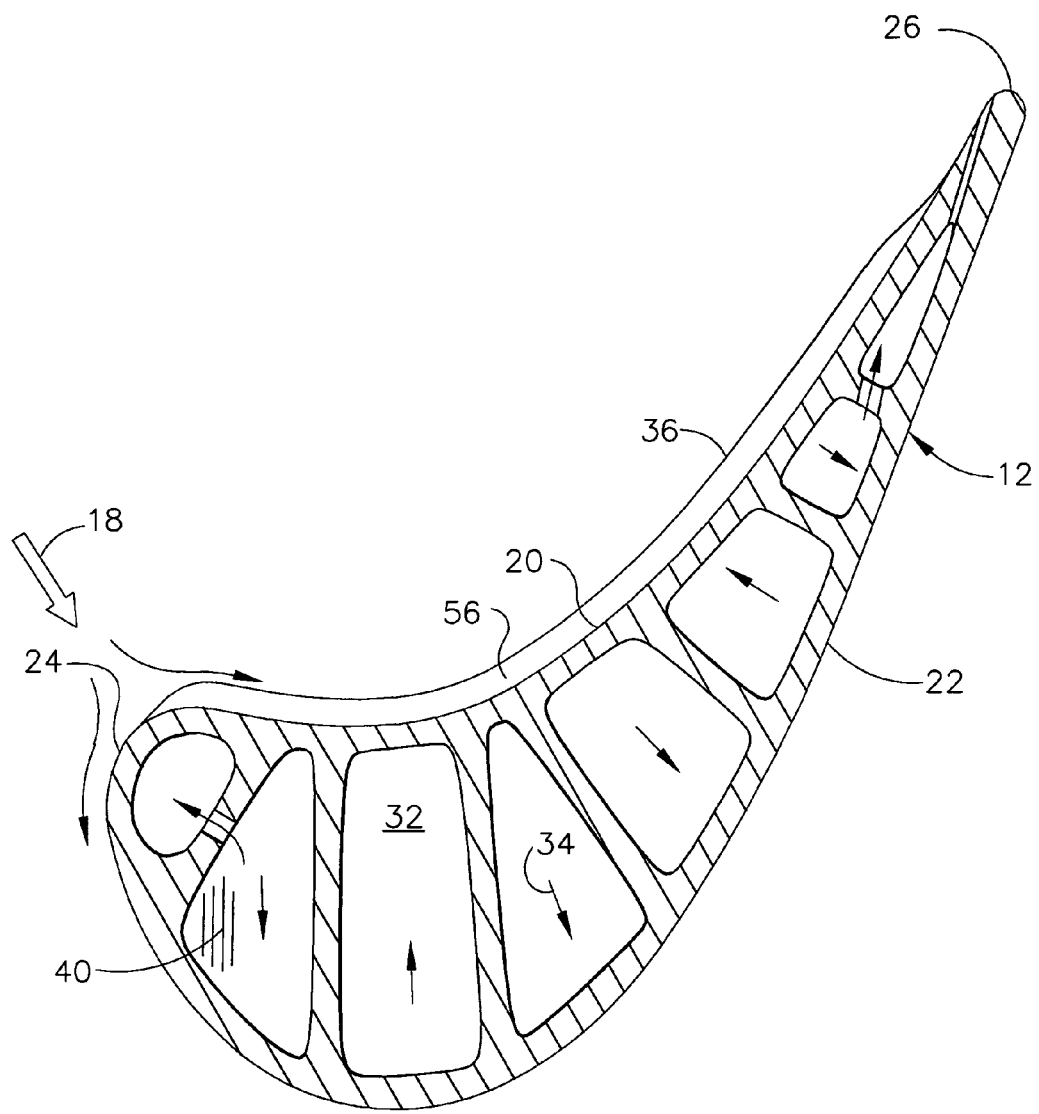
FIG. 2 is a radial sectional view through the turbine airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26 and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

FIG. 2 illustrates an exemplary radial cross section of the airfoil and the typical crescent profile thereof which varies suitably from root to tip of the airfoil as required for extracting energy from the combustion gases. Common to the various radial cross sections is the airfoil increasing rapidly in transverse width aft from the leading edge 24 to the hump location of maximum width just before the midchord of the airfoil, with the airfoil then decreasing gradually in width to the narrow or thin trailing edge 26.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil.

Figure 3:
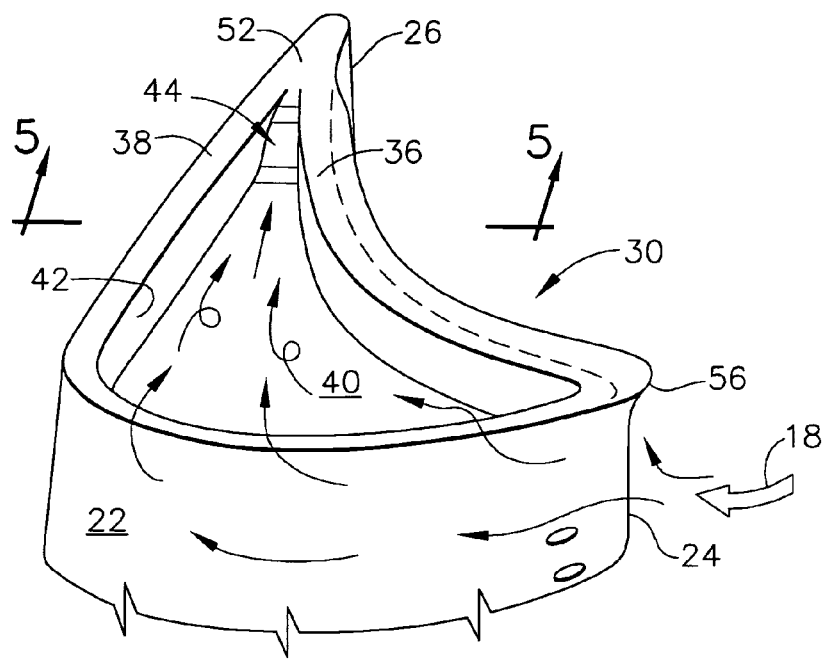
FIG. 3 is a front isometric view of the airfoil tip illustrated in FIG. 1.

The two ribs 36,38 as shown in FIGS. 1 and 3 extend radially outwardly from a common tip floor 40 which encloses the internal cooling circuit 32. The tip floor 40 may be imperforate, or may include small cooling holes or larger dust holes for discharging spent cooling air from inside the airfoil.

The two ribs 36,38 extend continuously along the respective pressure and suction sides 20,22 of the airfoil between the axially or chordally opposite leading and trailing edges 24,26 to define and provide a full perimeter boundary for a tip recess or cavity 42. The tip cavity faces radially outwardly, with an open mouth or inlet that is coplanar with the surrounding tip ribs 36,38 which preferably have a common and constant height above the tip floor.

During operation as illustrated schematically in FIG. 3, the combustion gases 18 split along the airfoil leading edge 24 and flow downstream along the opposite pressure and suction sides of the airfoil. Some of these combustion gases migrate radially outwardly and flow over the airfoil tip and enter the open tip cavity 42. Inside the open tip cavity, the combustion gases develop secondary or tertiary flow fields and vortices and flow aft toward the trailing edge 26.

Accordingly, the airfoil tip is specifically modified to include a discharge or exit ramp 44 which transversely bridges the opposite tip ribs 36,38 near the thin trailing edge 26. The exit ramp increases or rises in elevation aft from its junction with the aft end of the tip floor 40 toward the trailing edge.

Figure 4:
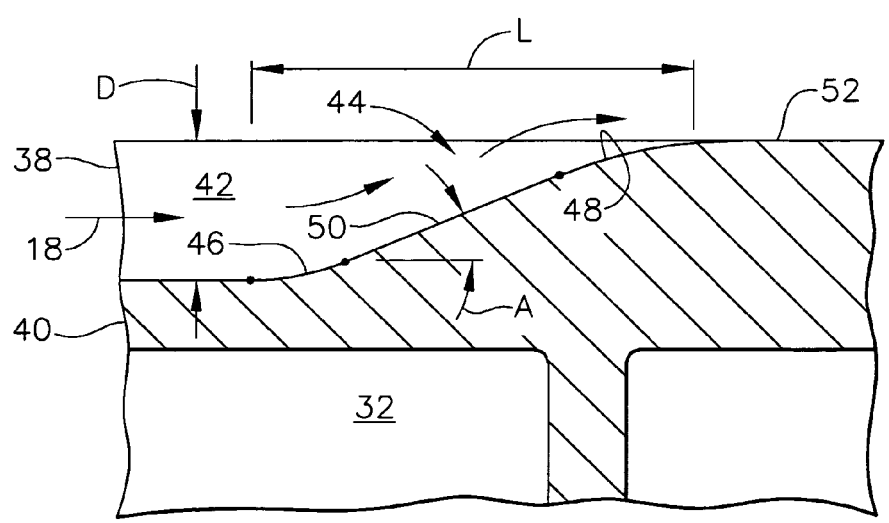
FIG. 4 is a chordally sectional view through the aft end of the airfoil tip illustrated in FIG. 1 and taken along line 4-4.
Figure 5:
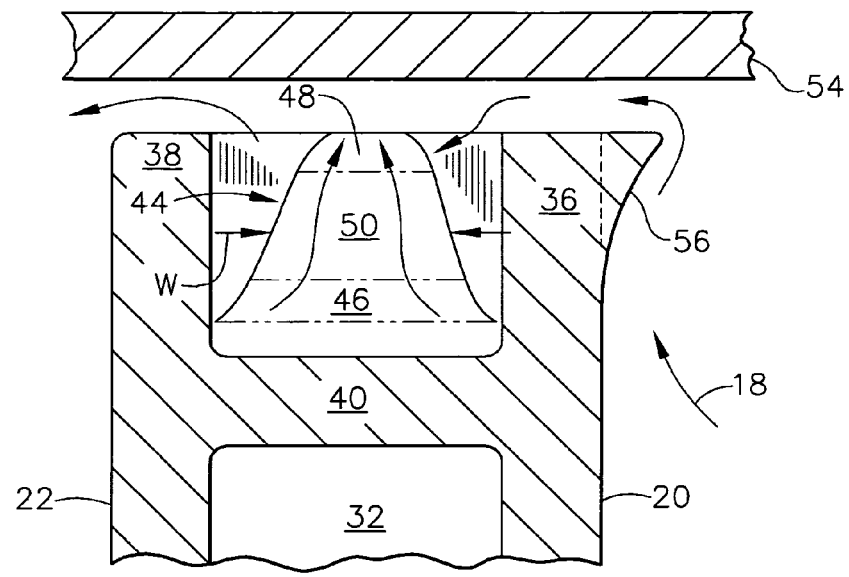
FIG. 5 is a transverse sectional view through the airfoil tip illustrated in FIG. 3 and taken along line 5-5.

The exit ramp 44 is illustrated in FIG. 4 in longitudinal profile along the chord axis of the airfoil, and in transverse sectional view in FIG. 5 across the width of the airfoil between the opposite pressure and suction sides. The exit ramp includes a forward land 46 extending forward toward the leading edge 24 which blends smoothly with the aft end of the tip floor 40 between the two ribs 36,38. The ramp also includes an aft land 48 extending aft toward the trailing edge 26 and blending smoothly with the outer or top surface of the airfoil tip.

The two lands 46,48 are differently configured to blend differently with the opposite portions of the tip cavity, with the forward land 46 being lower in elevation than the higher aft land 48. The exit ramp 44 preferably also includes a middle land 50 sloping or inclined outwardly from the forward land 46 aft to the higher aft land 48.

FIGS. 3-5 illustrate that the concave pressure side 20 and the convex suction side 22 of the airfoil converge together aft toward the trailing edge 26. And, the tip ribs 36,38 similarly converge aft together since they are integral with the outer ends of the airfoil sides.

The tip cavity 42 is fully bound by the two ribs 36,38 and itself converges aft in width toward the airfoil trailing edge. The two ribs 36,38 share a forward rib junction at the leading edge 24, then diverge and converge aft in transverse spacing to another junction at the trailing edge.

In particular, the airfoil trailing edge 26 is relatively thin and the two thin ribs 36,38 join or blend parallel together immediately upstream of the trailing edge at a common aft rib junction 52. The rib junction is initially wider than each of the two ribs 36,38 and typically converges aft to the thin trailing edge 26 in a common rib portion in conventional practice.

Accordingly, the exit ramp 44 is introduced at the aft end of the tip cavity 42 where it converges to its minimum width at the aft rib junction 52. The exit ramp provides an aerodynamically smooth transition from the lower elevation tip floor 40 to the higher elevation rib junction 52 which shares a common radially outer external surface with the two ribs 36,38 at a common or coplanar elevation above the tip floor 40.

FIG. 5 illustrates a portion of the conventional turbine shroud 54 that surrounds a full row of the turbine rotor blades to provide a relatively small radial clearance or gap between the inner surface of the shroud and the radially outer, external surface of the airfoil tips. During operation, a portion of the combustion gases 18 leaks transversely through the tip clearance from the airfoil pressure side to the opposite airfoil suction side.

The introduction of the exit ramp 44 illustrated in FIGS. 3-5 provides an aerodynamically smooth transition for the combustion gases that discharge from the airfoil tip cavity 42 and meet the combustion gases leaking over the trailing edge region of the airfoil.

FIG. 4 illustrates a preferred profile or contour of the exit ramp 44 in the chord in or axial direction of the airfoil for providing the aerodynamically smooth transition of the combustion gases. It is desired to reduce or eliminate flow separation of the combustion gases as they are discharged from the aft end of the tip cavity, and correspondingly reduce pressure losses associated therewith.

As shown, the ramp 44 has a total length L in its longitudinal or chord direction which is preferably greater than the corresponding depth D of the tip cavity 42 at the start of the ramp itself.

The ramp 44 is inclined or rises aft at an acute inclination or ramp angle A which is preferably sufficiently shallow to minimize flow separation of the combustion gases flowing therealong. The ramp inclination angle may be about 15 degrees to about 60 degrees depending upon the flow characteristics that affect flow separation.

As shown in FIG. 5, the ramp 44 decreases or converges aft in width W between the forward and aft lands 46,48 as the ramp simultaneously increases in elevation therebetween.

In this configuration, the aft portion of the tip cavity directly above the exit ramp 44 decreases in flow area downstream over the ramp and correspondingly accelerates the combustion gases flowing therealong. This local flow acceleration increases velocity and momentum of the combustion gases for improving aerodynamic performance of the turbine blade.

FIG. 4 illustrates how the forward and aft lands 46,48 blend differently with the tip floor 40 and the rib junction 52, respectively, in the ramp longitudinal or downstream direction. The forward land 46 is preferably chordally concave and faces outwardly to smoothly blend with the relatively flat tip floor 40. Correspondingly, the aft land 48 is preferably convex outwardly where it blends with the outer surface of the rib junction 52.

As shown in FIG. 5, the exit ramp 44 is preferably straight along its transverse width between the two opposite ribs 36,38 and is joined thereto with relatively small arcuate fillets. The width W of the exit ramp should not be less than a suitable minimum value, of about 30 mils (7.6 mm), which would degrade or eliminate the benefits thereof. If either the tip cavity or exit ramp are too narrow, the combustion gases leaking over the airfoil tip in the narrow region will simply flow over such narrow portion of the cavity with little, if any, improvement in aerodynamic performance.

As indicated above, the total length L of the exit ramp is preferably greater than the depth D of the tip cavity, and may be about three times that depth for having a suitably gradual transition to channel the combustion gases smoothly out of the cavity. The middle land 50 is preferably chordally longer than the forward land 46 and blends smoothly and coextensively therewith. The middle land 50 is also preferably longer than the aft land 48 and also blends smoothly and coextensively therewith.

In this way, the forward and aft lands 46,48 may provide correspondingly different transitions at the base and top of the exit ramp, with the middle land 50 providing a longer transition over the corresponding majority of the tip cavity depth.

Since the forward land 46 is preferably concave and the aft land 48 is preferably convex, the middle land 50 may have any suitable, and preferably different, profile therebetween for enhancing aerodynamic performance. For example, the middle land 50 may be chordally straight between the forward and aft lands to efficiently discharge the combustion gases from the tip cavity.

In the exemplary embodiment illustrated in FIGS. 1, 3, 5, the two tip ribs 36,38 fully bound the pressure and suction sides of the airfoil to define a single tip cavity 42 which converges aft into a single exit ramp 44. In this way, some of the tip leakage gases flow over the second rib 38 near the leading edge 24 and enter the tip cavity 42 for flow aft toward the exit ramp 44. The exit ramp as bound by the aft ends of the two ribs 36,38 then accelerates the gases discharged from the tip cavity. Less pressure is lost inside the tip cavity which correspondingly increases the cavity pressure, and in turn reduces leakage over the airfoil tip.

The exit ramp 44 may be introduced into the turbine rotor blade illustrated in FIGS. 1-5 in conjunction with other features such as an arcuate flare 56 that extends along substantially the entire length of the first rib 36. The flare 56 diverges radially outwardly from the airfoil pressure side 20 to increases resistance to the flow of the combustion gases through the tip-shroud clearance.

CFD analysis has been conducted for the exemplary airfoil tip illustrated in FIGS. 1-5 with and without the flare 56, and relative to a reference airfoil tip without either the exit ramp or flare affecting performance of the otherwise conventional first and second tip ribs 36,38.

In the flareless embodiment, leakage of the combustion gases over the airfoil tip may be significantly reduced by introducing the exit ramp, and a significant improvement of turbine efficiency may also be obtained.

For the combined embodiment including both the exit ramp 44 and the pressure side tip flare 56 illustrated in FIGS. 3 and 5, for example, no detectable change in tip leakage was observed. However, the introduction of the flare further increases turbine efficiency over that obtained from the use of the exit ramp alone.

In view of the relative simplicity of the exit ramp 44 it may be used in various other embodiments of turbine rotor blades having one or more tip cavities.

Figure 6:
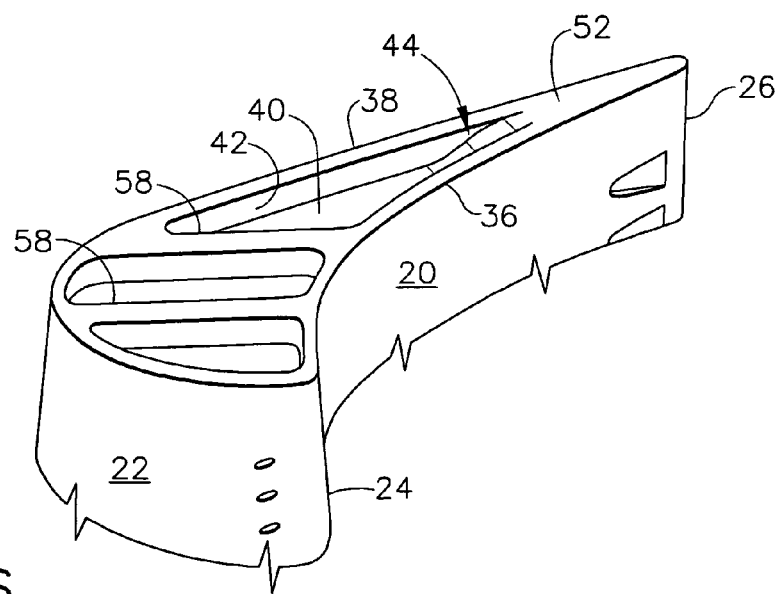
FIG. 6 is an isometric view of the airfoil tip illustrated in FIG. 1 in accordance with an alternate embodiment.

For example, FIG. 6 illustrates an alternate tip configuration for the turbine blade illustrated in FIG. 1, without the flare 56. In this configuration, one or more tip baffles 58 transversely bridge the two ribs 36,38 forward of the exit ramp 44. In FIG. 6, two of the tip baffles 58 are provided and spaced chordally apart to define three tip cavities or pockets bridging the opposite sides of the airfoil.

The exit ramp 44 described above may be similarly introduced into the last or aft tip cavity in FIG. 6 to smoothly discharge the combustion gases therefrom aft over the rib junction 52. In this embodiment, the middle land of the exit ramp may be slightly convex in the chordal direction to blend with the convex aft land.

Figure 7:
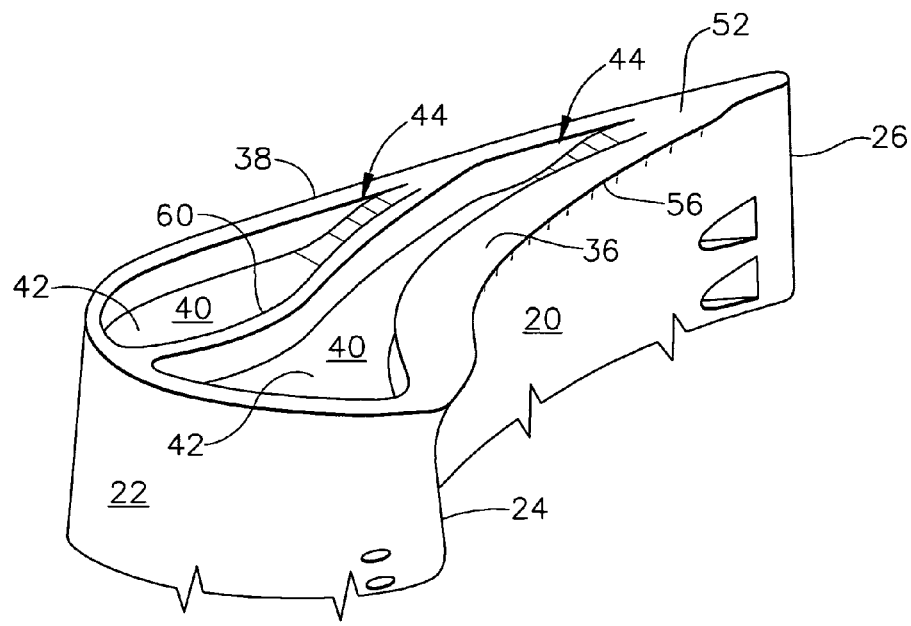
FIG. 7 is an isometric view of the airfoil tip illustrated in FIG. 1 in accordance with an alternate embodiment.

FIG. 7 illustrates yet another embodiment of the flared airfoil tip in which a differently configured tip baffle 60 extends chordally from the forward portion of the second rib 38 near the leading edge 24 to the aft portion of the same second rib 38 forward of the trailing edge 26. The chordal baffle 60 bifurcates the airfoil tip into a first tip cavity 42 extending along the pressure side 20, and a second tip cavity 42 extending along the suction side 22 in the region of the maximum width of the airfoil tip.

In this embodiment, each of the two tip cavities 42 may include corresponding ones of the exit ramps 44 at the aft ends thereof. The aft end of the tip baffle 60 blends with an intermediate portion of the second rib 38 to provide a corresponding rib junction like the rib junction 52 between the aft ends of the two ribs 36,38.

Both tip cavities 42 converge in the downstream direction, and the corresponding exit ramps 44 may be introduced therein to provide aerodynamically smooth discharge of the combustion gases from each of the two cavities for discharge over the corresponding portions of the suction side second rib 38.

Figure 8:
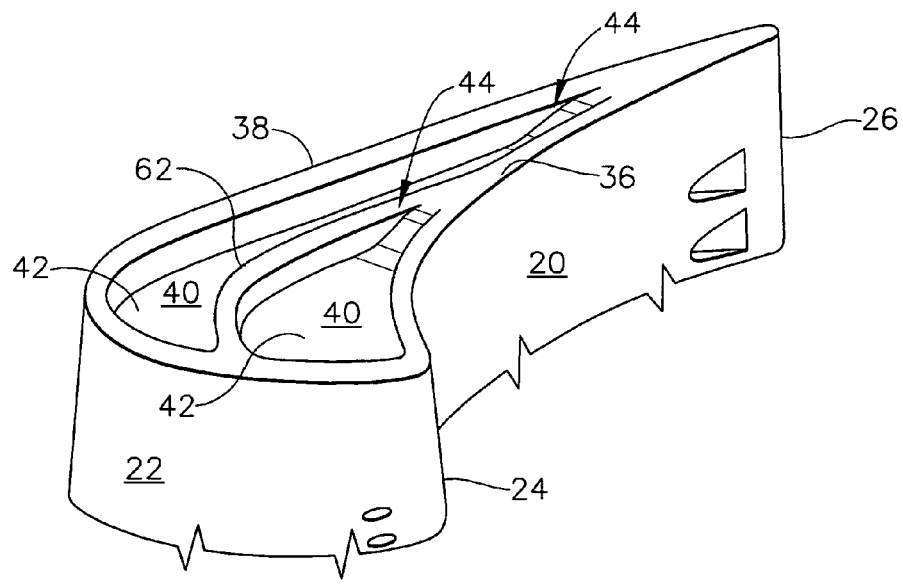
FIG. 8 is an isometric view of the airfoil tip illustrated in FIG. 1 in accordance with an alternate embodiment.

FIG. 8 illustrates yet another embodiment of the flareless airfoil tip in which a different tip baffle 62 extends chordally aft from the forward portion of the second rib 38 near the leading edge 24 to an intermediate portion of the opposite first rib 36 forward of the trailing edge 26. The chordal tip baffle 62 bifurcates the airfoil tip into a first tip cavity 42 along the pressure side 20 and a second tip cavity 42 along the suction side 22. Each of the two tip cavities may include respective ones of the exit ramps 44 at the aft ends thereof.

In FIG. 7, the tip baffle 60 has a chordal profile which is opposite or counter to the convex profile of the second rib 38 and opposite to the concave profile of the first rib 36. In FIG. 8, the tip baffle 62 has a chordal profile which is similar to or conforms with the convex profile of the second rib 38 and also conforms with the concave profile of the first rib 36.

In both embodiments illustrated in FIGS. 7 and 8, the respective tip baffles 60,62 bifurcate transversely the airfoil tip into two cavities which extend in the aft direction toward the common trailing edge 26. Both cavities in both embodiments converge as the airfoil converges to the trailing edge. And, the converging exit ramp 44 may be introduced at the aft ends of both cavities in both embodiments for similar advantages in turbine efficiency and tip flow leakage.

The different embodiments of the different airfoil tips disclosed above result in different aerodynamic performance of the turbine rotor blade. The velocity and pressure distributions of the combustion gases as they flow downstream over the pressure and suction sides of the airfoil will correspondingly vary over the airfoil tips in accordance with the different designs thereof.

The specific configuration and size of the exit ramps 44 disclosed above may therefore vary as the individual airfoil tip design requires for discharging the combustion gases from the tip cavities over the corresponding exit ramps with little, if any, flow separation thereof. Reducing pressure losses in the flow of the tip gases through the tip cavities will correspondingly increase pressure in the tip cavities for reducing tip flow leakage over the airfoil tips.

The cavity flow discharged over the exit ramp will be accelerated to a higher velocity and higher momentum for correspondingly improving turbine efficiency in different amounts for different designs and for different placement of the exit ramps in the differently configured airfoil tips.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
 a hollow airfoil, platform, and integral dovetail;
 said airfoil including transversely opposite pressure and suction sides extending chordally between opposite leading and trailing edges, and longitudinally in span from root to tip, wherein said pressure side is concave and said suction side is convex and converge together aft toward said trailing edge;
 said tip including first and second tip ribs extending outwardly from a tip floor along said pressure and suction sides between said leading and trailing edges to define a tip cavity, and said tip floor enclosing an internal cooling circuit, wherein said first and second tip ribs are integral with said pressure and suction sides, respectively, and bound said tip cavity to converge aft in width to said rib junction; and
 an exit ramp bridging said first and second ribs at an aft junction thereof near said trailing edge and rising in elevation aft from said tip floor, wherein said ramp converges aft in width and includes a forward land blending forwardly with said tip floor, an aft land blending with said aft junction of said ribs, and a middle land sloping outwardly from said forward land to said aft land, wherein said forward land is chordally concave, and said aft land is chordally convex.

2. A blade according to claim 1 wherein said ramp has a length greater than the depth of said tip cavity.

3. A blade according to claim 1 wherein said ramp rises aft at a shallow inclination angle.

4. A blade according to claim 1 wherein said forward and aft lands blend differently with said tip floor and rib junction.

5. A blade according to claim 1 wherein said middle land is longer than said forward land and blends smoothly therewith, and is longer than said aft land and blends smoothly therewith.

6. A blade according to claim 1 wherein said middle land is chordally straight.

7. A blade according to claim 1 wherein said first and second tip ribs bound said pressure and suction sides to define a single tip cavity converging aft into a single exit ramp.

8. A hollow turbine blade comprising first and second tip ribs extending outwardly from a tip floor along pressure and suction sides between leading and trailing edges to define a tip cavity therebetween, said tip floor enclosing an internal cooling circuit, and an exit ramp bridging said ribs and rising in elevation aft from said tip floor, wherein said ramp includes a forward land extending forward toward said leading edge and blending with said tip floor, and an aft land extending aft toward said trailing edge and blending with the junction of said ribs, and a middle land sloping outwardly from said forward land to said aft land wherein said forward and aft lands blend differently with said tip floor and rib junction, and wherein said forward land is chordally concave.

9. A blade according to claim 8 wherein said ramp has a length greater than the depth of said tip cavity.

10. A blade according to claim 8 wherein said ramp rises aft at a shallow inclination angle.

11. A blade according to claim 8 wherein said aft land is chordally convex.

12. A blade according to claim 8 wherein said middle land is longer than said forward and aft lands.

13. A blade according to claim 8 wherein said middle land is chordally straight.

14. A blade according to claim 8 wherein said middle land is chordally convex.

15. A blade according to claim 8 wherein:
said pressure side is concave and said suction side is convex and converge together aft toward said trailing edge;
said first and second tip ribs are integral with said pressure and suction sides, respectively, and bound said tip cavity to converge aft in width to said rib junction; and
said ramp converges aft in width between said forward and aft lands.

16. A blade according to claim 8 wherein said first and second tip ribs bound said pressure and suction sides to define a single tip cavity converging aft into a single exit ramp.

17. A blade according to claim 8 further comprising a tip baffle transversely bridging said first and second ribs forward of said exit ramp.

18. A blade according to claim 8 further comprising a tip baffle extending chordally from said second rib near said leading edge to said second rib forward of said trailing edge to define a first tip cavity along said pressure side and a second tip cavity along said suction side, and each of said tip cavities includes one of said exit ramps at the aft end thereof.

19. A blade according to claim 8 further comprising a tip baffle extending chordally from said second rib near said leading edge to said first rib forward of said trailing edge to define a first tip cavity along said pressure side and a second tip cavity along said suction side, and each of said tip cavities includes one of said exit ramps at the aft end thereof.

\* \* \* \* \*